United States Patent

Vogan et al.

[11] Patent Number: 5,968,107
[45] Date of Patent: Oct. 19, 1999

[54] SYSTEM AND METHOD FOR ENGINE PARAMETER TRENDING

[75] Inventors: Mitchell P. Vogan; James C. Dager, both of Columbus; Merrick C. Stoughton, Seymour; Todd E. Greenwood, Columbus, all of Ind.

[73] Assignee: Cummins Engine Company, Inc., Columbus, Ind.

[21] Appl. No.: 08/960,427

[22] Filed: Oct. 31, 1997

[51] Int. Cl.⁶ .................................................. G06F 19/00
[52] U.S. Cl. .............................. 701/102; 701/29; 701/115
[58] Field of Search .................................. 701/102, 115, 701/29, 30, 35, 33

[56] References Cited

U.S. PATENT DOCUMENTS

| | | | |
|---|---|---|---|
| 4,280,185 | 7/1981 | Martin | 364/506 |
| 4,525,782 | 6/1985 | Wohlfarth et al. | 364/431.01 |
| 4,677,558 | 6/1987 | Bohmer et al. | 701/102 |
| 4,843,575 | 6/1989 | Crane | 364/550 |
| 5,018,069 | 5/1991 | Pettigrew | 364/424.04 |
| 5,033,010 | 7/1991 | Lawrence et al. | 701/35 |
| 5,070,458 | 12/1991 | Gilmore et al. | 364/424.06 |
| 5,239,470 | 8/1993 | Komatsu | 364/424.04 |
| 5,463,567 | 10/1995 | Boen et al. | 364/551.01 |
| 5,481,193 | 1/1996 | Mueller et al. | 324/379 |
| 5,506,773 | 4/1996 | Takaba et al. | 364/424.03 |
| 5,852,793 | 12/1998 | Board et al. | 702/56 |

*Primary Examiner*—Willis R. Wolfe
*Assistant Examiner*—Hieu T. Vo
*Attorney, Agent, or Firm*—Woodard, Emhardt, Naughton Moriarty & McNett

[57] ABSTRACT

A system and method for engine parameter trending in which the engine control module (ECM) periodically stores to non-volatile memory various engine operating parameters over the life of the engine. The system is configurable such that a variable number of samples of a variable number of engine parameters can be stored. In addition to storing each engine parameter, each write to non-volatile memory is also time stamped. This data is used to track the health of the engine over its life cycle. Such data can be useful in providing decreased down time due to increased troubleshooting ability. The system includes a variable number of calibratable predetermined trigger points available so that the data is always logged under the same operating conditions. All triggers must be satisfied for a specified time in order to ensure consistent engine operating conditions when each data set is taken. When all of the predetermined input trigger thresholds have been met for a calibratable predetermined length of time and a predetermined time interval has been reached, the designated parameters are stored in non-volatile memory for extraction and use by a service tool. If the trigger preconditions are not satisfied, the ECM will wait a percentage of the data-logging time increment in order for the preconditions to all be satisfied before writing the monitored parameters to non-volatile memory. If the preconditions are not met after that additional time period, the ECM will evaluate the individual conditions and write to non-volatile memory whichever monitored parameters are valid, given which preconditions have been met.

15 Claims, 7 Drawing Sheets

SYSTEM AND METHOD FOR ENGINE PARAMETER TRENDING

TECHNICAL FIELD OF THE INVENTION

The present invention generally relates to electronic engine control modules and, more particularly, to a system and method for engine parameter trending.

BACKGROUND OF THE INVENTION

It is well-known that internal combustion engines exhibit degradation in performance and/or reliability over time as wear occurs on the moving portions of the engine. Without maintenance, all engines will eventually fail after some period of use. Additionally, it has long been recognized that preventative maintenance (servicing the engine before it fails) can substantially reduce the overall cost of operating an engine. This is because the pieces of an engine work in concert with one another, and failure of one piece can lead directly to failure of other pieces. Replacing the pieces that are most likely to fail before such failure occurs can therefore substantially lower engine maintenance costs. Obviously, it is desirable to be able to predict when such failure is likely to occur so that preventative maintenance can be performed beforehand, but not so early that a significant portion of the replaced part's useful life is not utilized.

For applications where the engine is in a commercial vehicle, such as a diesel truck, it is also desirable to be able to predict engine failure in advance in order to minimize productive downtime of the vehicle. Such downtime can be very expensive to the vehicle owner due to lost revenue in addition to the repair cost.

Most modern engines are controlled by an electronic engine control module (ECM) that has access to the readings of various sensors placed around the engine, and it is known in the prior art to cause the ECM to periodically store selected sensor data in order to track the "health" of the engine versus time. Such data can be very useful in predicting mechanical failures in advance of a breakdown so that preventative maintenance can be performed. Such data can also be valuable to instill buyer confidence in the health of an engine when it is sold on the used market.

However, the ability to forecast the need for engine servicing and the ability to troubleshoot engine failure by looking at historical engine sensor data can be hampered if the data is not collected in a controlled manner. There is therefore a need for an engine control module that is operative to collect and store engine data in a consistent manner, such that all of the data stored is relevant to the rest of the stored data, thereby making historical data comparisons useful. The present invention is directed toward meeting this need.

SUMMARY OF THE INVENTION

The present invention relates to a system and method for engine parameter trending in which the engine control module (ECM) periodically stores to non-volatile memory various engine operating parameters over the life of the engine. The system is configurable such that a variable number of samples of a variable number of engine parameters can be stored. In addition to storing each engine parameter, each write to non-volatile memory is also time stamped. This data is used to track the health of the engine over its life cycle. Such data can be useful in providing decreased down time due to increased troubleshooting ability. The system includes a variable number of calibratable predetermined trigger points available so that the data is always logged under the same operating conditions. All triggers must be satisfied for a specified time in order to ensure consistent engine operating conditions when each data set is taken. When all of the predetermined input trigger thresholds have been met for a calibratable predetermined length of time and a predetermined time interval has been reached, the designated parameters are stored in non-volatile memory for extraction and use by a service tool. If the trigger preconditions are not satisfied, the ECM will wait a percentage of the data-logging time increment in order for the preconditions to all be satisfied before writing the monitored parameters to non-volatile memory. If the preconditions are not met after that additional time period, the ECM will evaluate the individual conditions and write to non-volatile memory whichever monitored parameters are valid, given which preconditions have been met. Preferably, three samples are taken within the first 100 hours of operation of the engine, and the time interval for data logging thereafter reverts to a calibratable predetermined interval. It is desirable to sample and retain the engine's performance in the first 100 hours of operation in order to provide a baseline for future performance-related troubleshooting. If an engine rebuild occurs, the data storage process will begin again as if a new engine was being monitored. Any active system faults which are present will inhibit data acquisition until such faults are cleared.

In one form of the invention, a method for engine parameter trending is disclosed, comprising the steps of producing a plurality of engine parameter input signals indicative of an operating state of the engine; comparing a first subset of the plurality of engine parameter input signals to a plurality of respective predetermined trigger conditions; and storing a second subset of the plurality of engine parameter input signals if the first subset of the plurality of engine parameter input signals satisfy the plurality of respective predetermined trigger conditions for a predetermined length of time.

In another form of the invention, a method for engine parameter trending is disclosed, comprising the steps of establishing a first predetermined interval of time; waiting for the first predetermined interval of time to expire; establishing a data window commencing upon the expiration of the first predetermined interval and lasting for a length equal to a predetermined percentage of the first predetermined interval; producing a plurality of engine parameter input signals indicative of an operating state of the engine; comparing a first subset of a the plurality of engine parameter input signals to a plurality of respective predetermined trigger conditions; and storing a second subset of the plurality of engine parameter input signals if the first subset of the plurality of engine parameter input signals satisfy the plurality of respective predetermined trigger conditions for a predetermined length of time prior to an expiration of the data window.

DETAILED DESCRIPTION OF THE PREFERRED EMBODIMENT

Figure 1:
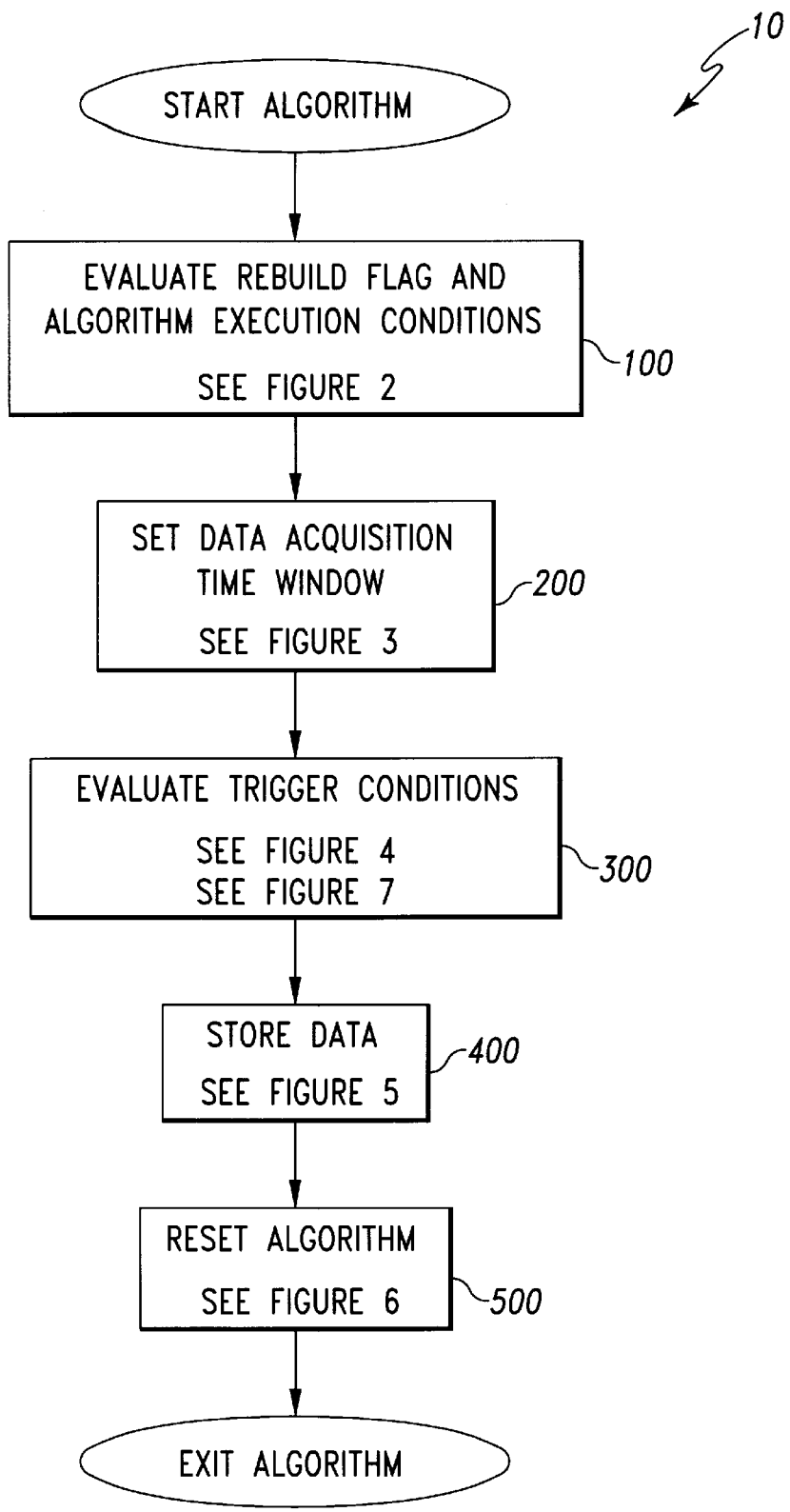
FIG. 1 is a schematic process flow diagram of a preferred embodiment engine parameter trending algorithm of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is illustrated a schematic process flow diagram of a preferred embodiment algorithm for executing the engine parameter trending method of the present invention. The algorithm is indicated generally at 10. The algorithm may be executed by any engine control module (ECM) which governs the operation of an internal combustion engine. Variable names utilized in the preferred embodiment algorithm are as follows:

I/O and Calibration Data Items
INPUT: Boost_Pressure
INPUT: Coolant_Temperature
INPUT: DC_Mon_Load_Factor
INPUT: Engine_Run Time
INPUT: Engine Speed
INPUT: Engine State
INPUT: Fault_Count_Table
INPUT: Intake_Manifold_Temperature
INPUT: J1587_Percent_Load
INPUT: Oil_Pressure
INPUT: Throttle_100_Fueling
INPUT: Total_Fuel_Usage
CALIBRATION: Trending_Clnt_Tmp_Max
CALIBRATION: Trending_Clnt_Tmp_Min
CALIBRATION: Trending_Interval
CALIBRATION: Trending_Engine_Speed_Max
CALIBRATION: Trending_Engine_Speed_Min
CALIBRATION: Trending_IMT_Max
CALIBRATION: Trending_IMT_Min
CALIBRATION: Trending_Number_Of_Samples
CALIBRATION: Trending_Percent_Load_Max
CALIBRATION: Trending_Percent_Load_Min
CALIBRATION: Trending_Triggers_Satisfied_TM
PWRD TRIM: Trending_Average_Fuel_Consumption
PWRD TRIM: Trending_Averaging_Number_Of_Counts
PWRD TRIM: Trending_Fuel_Usage_Start
PWRD TRIM: Trending_Interval_Timer
PWRD TRIM: Trending_Interval_Window_Active
PWRD TRIM: Trending_Interval_Window_Active_Last
PWRD TRIM: Trending_Interval_Window_Limit
PWRD TRIM: Trending_Interval_Window_Timer
PWRD TRIM: Trending_Load_Interval_Average
PWRD TRIM: Trending_Load_Running_Total
PWRD TRIM: Trending_Number_Of_Samples_At_Rebuild
PWRD TRIM: Trending_Number_Of_Samples_Taken
PWRD TRIM: Trending_Rebuild_Occurred
PWRD TRIM: Trending_Rebuild_time_Stamp
PWRD TRIM: Trending_Storage_Index
PWRD TRIM: Trending_Storage_Table
PWRD TRIM: Trending_Time_Stamp
PWRD TRIM: Trending_Torque_Curve_Identifier
PWRD TRIM: Trending_Trigger_Cond
PWRD TRIM: Trending_Trigger_Cond_Timer
PWRD TRIM: Trending_Trigger_Cond_True
ENGR TRIM: Trending_Algorithm_Enable Typically, such an ECM comprises a microprocessor and associated support circuitry which executes a control algorithm during engine operation. A typical ECM will be coupled to a plurality of sensors throughout the engine and vehicle which monitor various operating conditions and other parameters (i.e. the above variables labeled INPUT). This data is relayed to the ECM for use as input data to the control algorithm. The ECM further includes a plurality of outputs which are coupled to actuators within the engine and/or vehicle for changing the operating point of same. Because the ECM continuously executes its control algorithm whenever the engine is operational, the algorithm 10 of the present invention may be inserted as a subset of the general control algorithm, where it will be executed on a repetitive basis at some time interval. Because the ECM already has access to the data from the plurality of sensors placed at various points on the engine and/or vehicle, the engine parameter trending algorithm 10 may store selected ones of these sensed parameters to a non-volatile memory coupled to the ECM microprocessor whenever the system 10 determines that conditions are appropriate for saving such sensor data.

Figure 2:
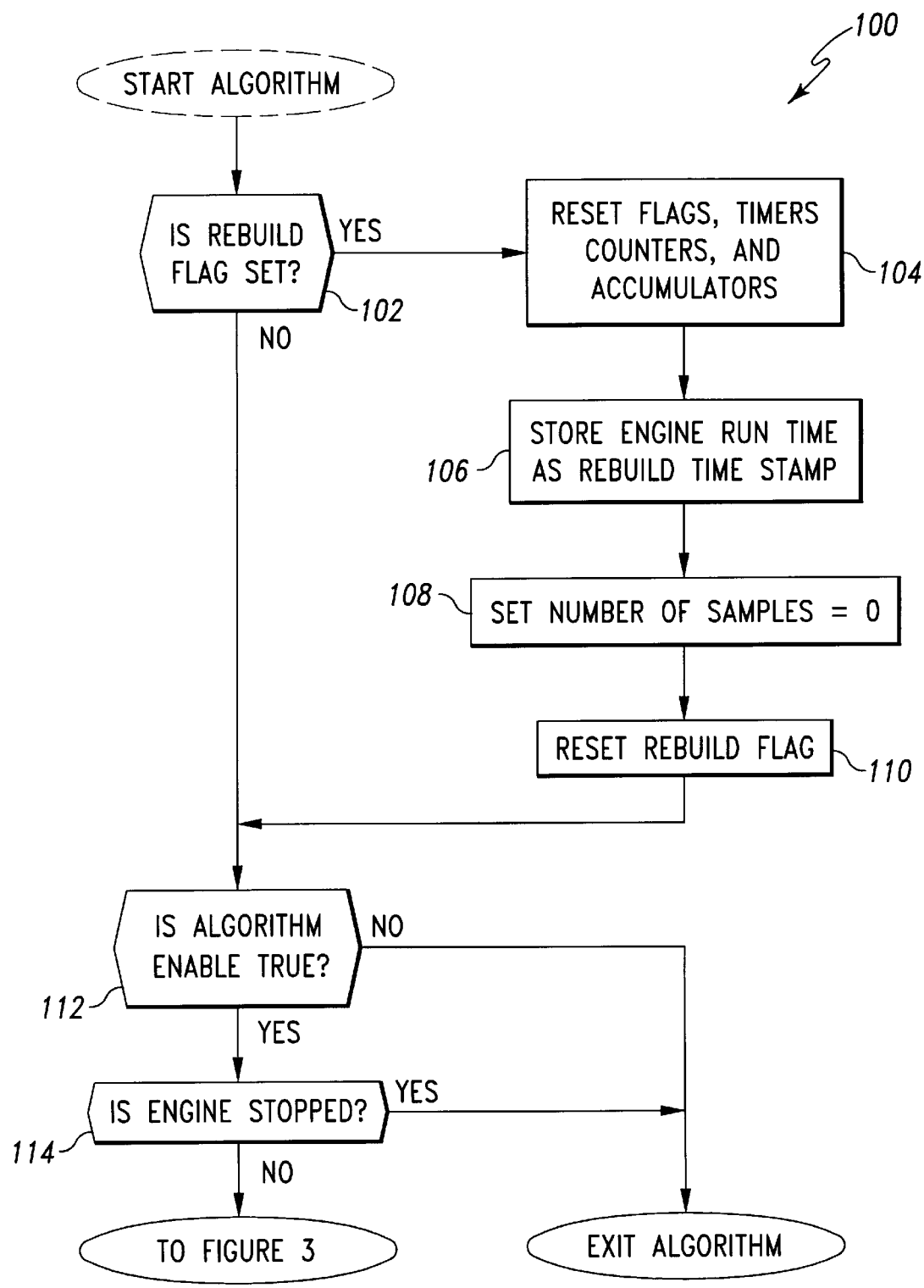
FIG. 2 is a schematic process diagram of a portion of the algorithm of FIG. 1 which evaluates the engine rebuild flag and algorithm execution conditions.

In the preferred embodiment system 10, the algorithm will periodically store engine operating parameters over the life of the engine. Preferably, fifty to one hundred samples of five different engine parameters are stored to non-volatile memory. There are four calibratable (i.e. changeable by the user) predetermined trigger points available so that the data is always logged under the same operating conditions. The algorithm begins at block 100, which evaluates the status of the engine rebuild flag and the algorithm enable flag. The subroutine for block 100 is illustrated in greater detail in FIG. 2. At step 102, the algorithm checks the software flag Trending_Rebuild_Occurred in order to determine if the flag has been set. The flag Trending_Rebuild_Occurred is set by the service tool after an engine rebuild. If the rebuild flag is set, then the engine should be treated as a new engine and the data storage process will begin again as if a new engine was being monitored. This means that three new samples will be taken in the first (subsequent) 100 hours of operation and the timing interval will revert to the calibrated predetermined value once these three data sets have been acquired. The appropriate flags, timers, counters, and accumulators are reset in step 104, and the time the rebuild occurred (Trending Rebuild_Time_Stamp) is written to non-volatile memory at step 106. At step 108, the variable Trending_Number_Of_Samples_Taken is reset to zero, and the flag Trending_Rebuild_Occurred is reset at step 110. Resetting the rebuild flag at step 110 ensures that steps 104–110 will not be executed again until the engine is again rebuilt. In summary, steps 104–110 accomplish the following:

i) Set Trending_Interval_Timer=0
ii) Set Trending_Interval_Window_Timer=0
iii) Set Trending_Trigger_Cond_Timer=0
iv) Set Trending_Trigger_Cond_True=FALSE v) Set Trending_Interval_Window_Active=INACTIVE vi) Set Trending_Averaging_Number_Of_Counts=0 vii) Write Engine_Run_Time to Trending_Rebuild_Time_Stamp viii) Set Trending_Rebuild_Occurred=FALSE ix) Write Trending_Number_Of_Samples_Taken to Trending_Number_Of_Samples_At_Rebuild x) Set Trending_Number_Of_Samples_Taken=0 xi) Set Trending_Internal_Window_Active_Last=INACTIVE xii) Set Trending_Load_Running_Total=0

After step 110, or if step 102 determined that the flag Trending_Rebuild Occurred was not set, the subroutine 100 proceeds to step 112 which checks to see if the flag Trending_Algorithm_Enable has been set. This flag is used to allow the system 10 of the present invention to be turned off without rewriting the entire control algorithm for the ECM. If the flag Trending_Algorithm_Enable is false, then subroutine 100 causes the ECM to exit the algorithm 10. If, however, the flag Trending_Algorithm_Enable is true at step 112, the subroutine 100 proceeds to step 114, which determines if the engine is stopped by examining an input variable Engine State from an appropriate sensor. If the engine is stopped, then no data logging should take place, therefore the subroutine 100 causes the system 10 to be exited. If step 114 determines that the engine is not stopped, then subroutine 100 is exited, and the algorithm 10 continues at block 200 (see FIG. 1).

Figure 3:
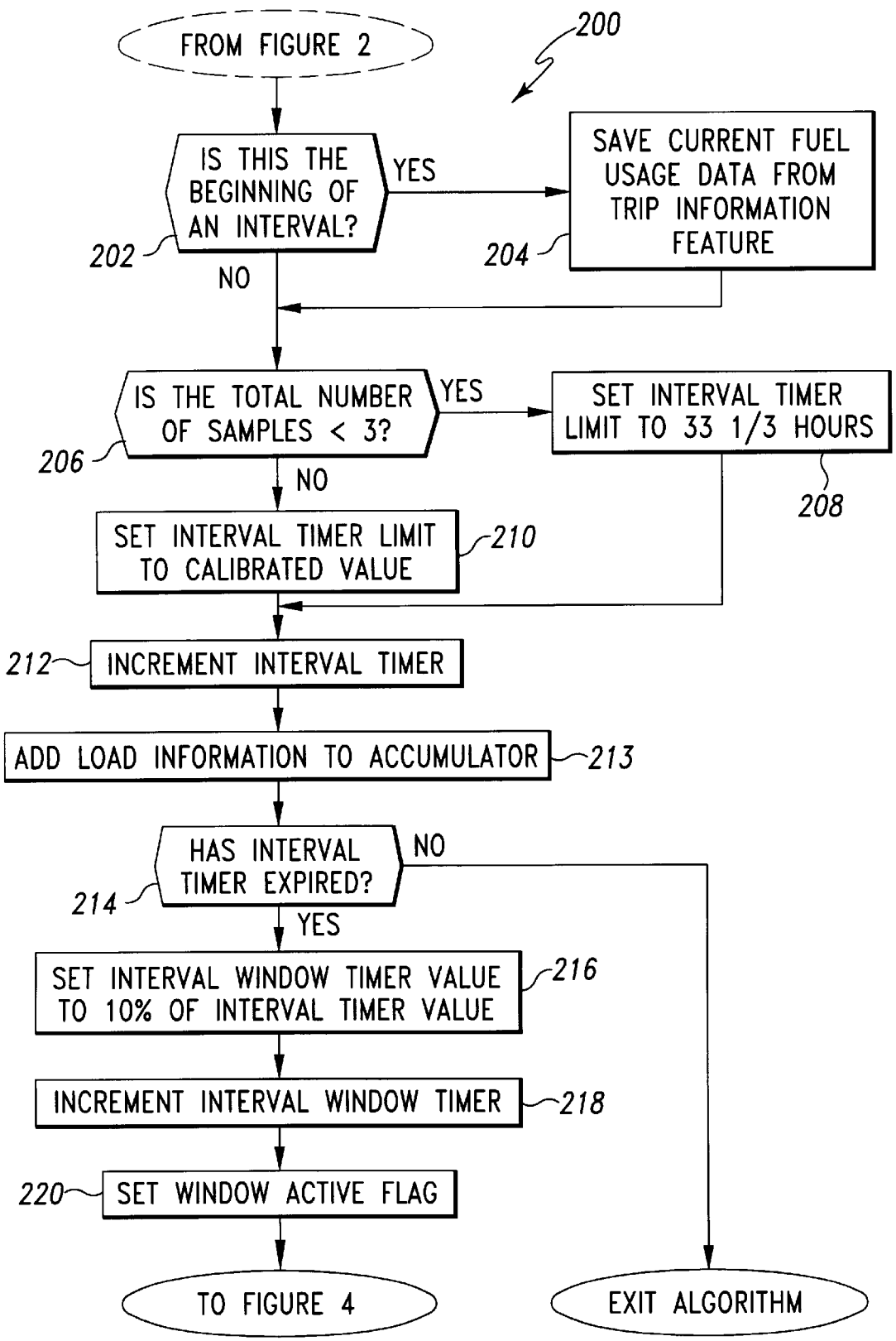
FIG. 3 is a schematic process diagram of a portion of the algorithm of FIG. 1 which sets the data acquisition time window.

Block 200 of the algorithm 10 is used to set up the data acquisition time window, and is illustrated in greater detail in FIG. 3. The subroutine 200 begins at step 202, which determines if the algorithm 10 is at the beginning of a data logging interval. The beginning of the data logging interval is indicated by the variable Trending_Interval_Timer equalling zero. The timer Trending_Interval Timer is used to calculate the elapsed time since the last data set was taken (or since the installation of a new engine or the occurrence of an engine rebuild). At the beginning of an interval, a snapshot of the status of Total_Fuel_Usage is taken to be used later in calculating the average fuel consumed during the present interval. This operation occurs at step 204 once at the start of each interval and does not occur again until a new interval is initiated. Step 204 accomplishes this by writing the value of Total_Fuel_Usage into the variable Trending_Fuel_Usage Start.

After step 204, or if step 202 indicated that this is not the beginning of an interval, the subroutine 200 proceeds to step 206 which determines if the variable Trending_Number_Of_Samples_Taken is less than three. If this variable is less than three, then this indicates that the algorithm 10 is still within the first 100 hours of operation of the engine, wherein the interval between the logging of data sets is desired to be 33 ⅓ hours. The limit of Trending_Interval_Timer is therefore set to 2,000 minutes at step 208 in order to cause a new data set to be logged after Trending_Interval_Timer reaches 33 ⅓ hours. If, on the other hand, step 206 determines that three or more samples have already been taken, then the interval between logging of data sets should be set to the calibrated value chosen by the user, which is stored in the variable Trending_Interval. Therefore, the variable trending_interval_limit is set equal to Trending_Interval at step 210. When the Trending_Interval_Timer reaches the limit trending_interval_limit, the window during which data may be taken begins and lasts for up to ten percent (10%) of the trending_interval_limit, stored as Trending_Interval_Window_Limit. Therefore, Trending_Interval_Timer is incremented at step 212 and step 214 checks to determine if Trending_Interval_Timer has reached the limit trending interval_limit. If not, then it is not time to log data, and the algorithm 10 is exited.

If, however, step 214 indicates that the current interval has expired and it is therefore desirable to log data, the subroutine 200 proceeds to step 216, which turns on a second timer (the Trending Interval_Window_Timer) which will expire at Trending_Interval_Window_Limit, which is equal to ten percent (10%) of the interval limit. The Trending_Interval_Window_Timer value is incremented at step 218, and the flag Trending_Interval_Window_Active is set at step 220. The flag Trending_Interval_Window_Active remains set so long as the Trending Interval_Window_Timer has not reached its limit Trending_Interval_Window Limit. Data may be taken and stored while Trending_Interval_Window_Active is set to the active state. As will be discussed hereinbelow, this flag will be reset to the inactive state when Trending_Interval_Window_Limit is reached or when a data set is taken.

If Trending_Interval_Window_Active is set to the active position (thereby indicating that the window active timer has not expired), the subroutine 200 then returns to the algorithm 10 of FIG. 1 and to box 300 in which the trigger conditions are evaluated. The subroutine 300 is described in greater detail in FIG. 4. Subroutine 300 begins at step 302, which checks to determine if a Trending_Interval_Window_Timer has expired, then the algorithm proceeds to subroutine 400 of FIG. 5 in order to determine if any data may be saved (since the active window period has expired without the trigger conditions being met). If the window active timer has not expired at step 302, then the subroutine 300 determines whether the data storage trigger conditions have been met at step 306 and whether the trigger time delay has been satisfied at step 308. If either of these conditions are not satisfied, then a data set is not stored to non-volatile memory and the algorithm 10 is exited. Steps 306 and 308 are illustrated in greater detail in FIG. 7.

Figure 7:
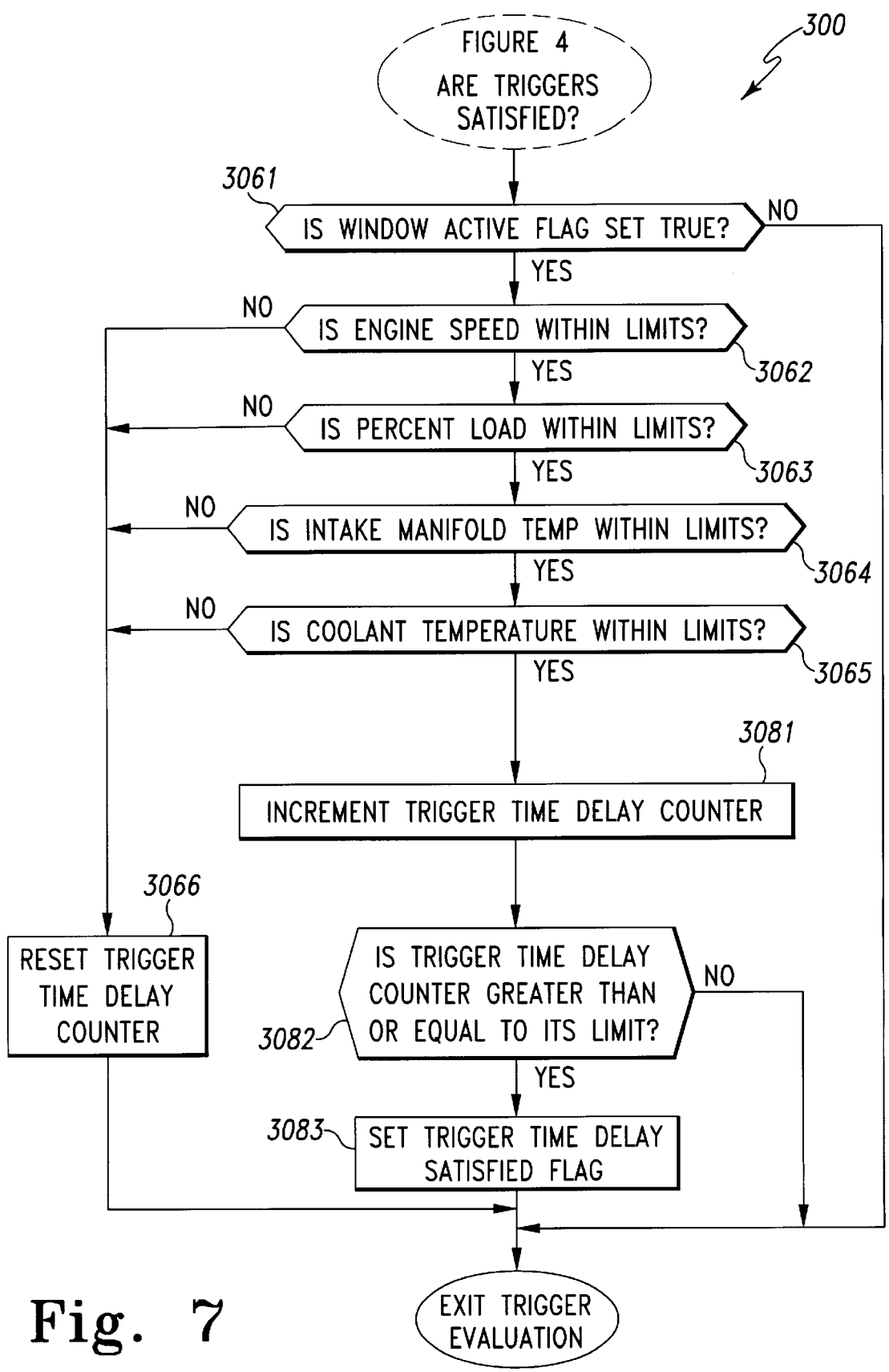
FIG. 7 is a schematic process diagram of a portion of the algorithm of FIG. 1 for evaluating the trigger conditions.

The subroutine of FIG. 7 is used to evaluate whether or not all of the predetermined trigger conditions have been satisfied in order to allow collection of a data set. All of the predetermined triggers must be satisfied for a specified time in order to ensure consistent engine operating conditions when each data set is taken. This is desirable in order to ensure that relevant comparisons can be made between different data sets stored at different times. The subroutine of FIG. 7 evaluates these predetermined trigger preconditions. First, at step 3061, the Trending_Interval_Window_Active flag is examined to determine whether it is set to the active position. If not, then the algorithm 10 is exited.

If the window active flag is set, then step 3062 determines whether the engine speed is within predefined limits by determining whether Engine_Speed has a value between Trending_Engine_Speed_Min and Trending_Engine_Speed Max. Engine_Speed is retrieved from an appropriate sensor coupled to the ECM, while the minimum and maximum engine speeds are calibratable predetermined values supplied to the algorithm 10. Similarly, step 3063 determines if the percentage load on the engine is within predefined limits by determining whether J1587_Percent_Load has a value between Trending_Percent_Load_Min and Trending_Percent_Load_Max. The value of J1587_Percent_Load is supplied to the ECM from an appropriate sensor, while the minimum and maximum values are calibratable limits which are supplied to the algorithm 10. Step 3064 determines whether the intake manifold temperature is within predefined limits by determining whether Intake_

Manifold_Temperature has a value between Trending_IMT_Min and Trending_IMT_Max. The value of Intake_Manifold Temperature is supplied to the ECM from an appropriate temperature sensor, while the minimum and maximum values are calibratable limits supplied to the algorithm 10. Finally, step 3065 determines whether the coolant temperature is within predefined limits by determining whether Coolant_Temperature has a value between Trending_Clnt_Tmp_Min and Trending_Clnt_Tmp_Max. The value of Coolant_Temperature as supplied to the ECM by an appropriate temperature sensor, while the minimum and maximum values are calibratable, limits supply to the algorithm 10.

Figure 4:
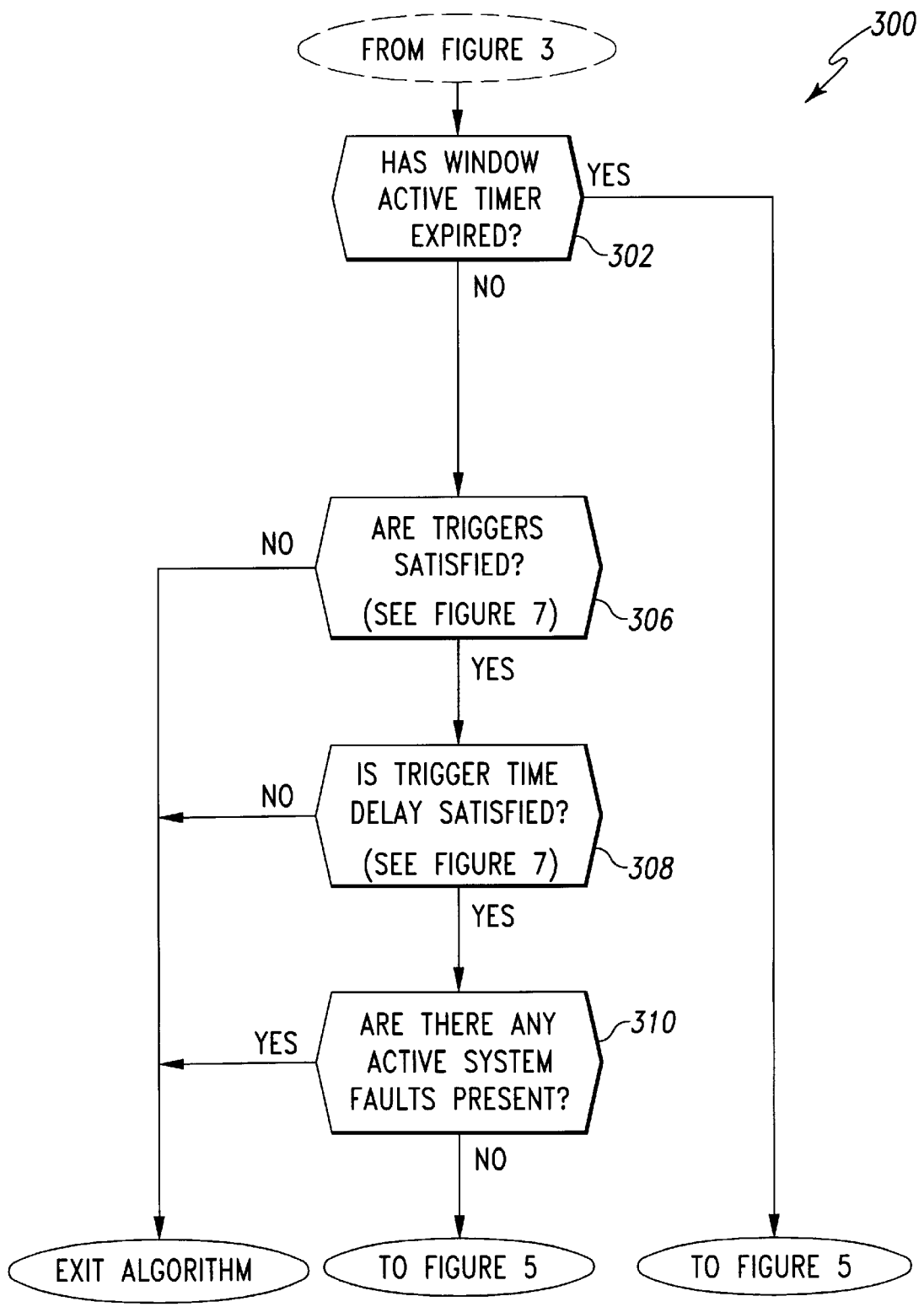
FIG. 4 is a schematic process diagram of a portion of the algorithm of FIG. 1 which evaluates the trigger conditions.

Therefore, step 306 of FIG. 4 must determine that all four preconditions are satisfied before a data set can be stored to non-volatile memory. In the preferred embodiment, these trigger preconditions are engine speed, percent load, intake manifold temperature, and coolant temperature being within predefined limits. It will be appreciated by those having ordinary skill in the art that any number of trigger preconditions may be specified within the scope of the present invention and also that any number of different conditions may be used as the triggers for storing a valid data set.

Not only must the four trigger preconditions be satisfied in the preferred embodiment algorithm of the present invention, but they must also remain true for a calibratable predetermined length of time. Therefore, if all of the trigger preconditions are true, step 3081 increments the trigger time delay counter Trending_Trigger_Cond_Timer. On the other hand, if any of the trigger preconditions were found to be not within the predefined calibratable limits at steps 3062–3065, the trigger time delay counter Trending_Trigger_Cond_Timer is reset to zero at step 3066 and the trigger evaluation subroutine is exited.

After the trigger time delay counter has been incremented at step 3081, step 3082 determines if the trigger time delay counter is greater than or equal to its limit Trending_Triggers_Satisfied_TM. If not, then the trigger evaluation subroutine is exited and the algorithm continues at step 308 (see FIG. 4). However, if the trigger time delay counter is greater than or equal to its limit at step 3082, step 3083 sets a flag Trending_Trigger_Cond_True to indicate that the time delay has expired with all trigger preconditions satisfied. The process then returns to step 310 of FIG. 4.

Step 310 determines if there are any active system faults present. Active system faults are an indication that there is a problem with the operation of the ECM and that there would therefore be some uncertainty as to whether any data stored during the presence of an active system fault would be valid. Therefore, if step 310 determines that there are active system faults present, algorithm 10 is exited. If there are no active system faults detected at step 310, the process continues to block 400 of FIG. 1, which decides what data will be stored to non-volatile memory. Subroutine 400 is illustrated in greater detail in FIG. 5. In the preferred embodiment, each data set stored to non-volatile memory will record values for turbo boost pressure, oil pressure, coolant temperature, average fuel consumption, calculated average load, and an identifier of the torque curve on which the engine is currently operating. Those having ordinary skill in the art will recognize that it may be desirable to store different values in each data set for different applications, or to store a greater or fewer number of values. The actual data stored in each data set is not considered to be critical to the present invention, as the composition of this data set will largely depend upon what particular use will be made of the data after it is stored.

In the preferred embodiment, when all of the input trigger thresholds have been met for a calibratable length of time, and the predetermined time delay interval has been reached, the desired parameters are stored in non-volatile memory for later extraction and use by a service tool. The monitored parameters are written to non-volatile memory three times within the first 100 hours of operation, as determined by the input Engine_Run_Time, if an of the trigger preconditions are satisfied. After three samples have been acquired at the 33 ⅓ hour intervals, the sampling interval reverts to the calibrated interval Trending Interval. As described in greater detail hereinbelow, if the trigger preconditions are not satisfied, the algorithm 10 waits ten percent (10%) of the predetermined interval in order for all of the trigger preconditions to be satisfied and to thus write the monitored parameters to non-volatile memory. If after that ten percent (10%) interval period the trigger preconditions are still not satisfied, the algorithm 10 will evaluate the individual parameters and write the monitored parameters to non-volatile memory under the following conditions (assuming no active system faults): 1) If the percent load trigger is not satisfied (step 3063) but all of the other trigger preconditions are satisfied at the end of the sample window, save the oil pressure reading to non-volatile memory and write a zero to the memory slots for boost pressure and coolant temperature; 2) If for any other reason a data set was not recorded because the trigger preconditions were not satisfied and the ten percent (10%) of the interval has expired, write a zero to the non-volatile memory slots for oil pressure, boost pressure, and coolant temperature (these zeros act as intentional placeholders to indicate that no data was recorded). Whenever a data set is taken, the average fuel consumption is calculated, converted to gallons-per-hour, and written to non-volatile memory. In addition, the average loading during the interval is calculated and written to non-volatile memory. Torque curve identity is also written to give meaning to the average loading. Finally, the data is time stamped in the non-volatile memory.

Figure 5:
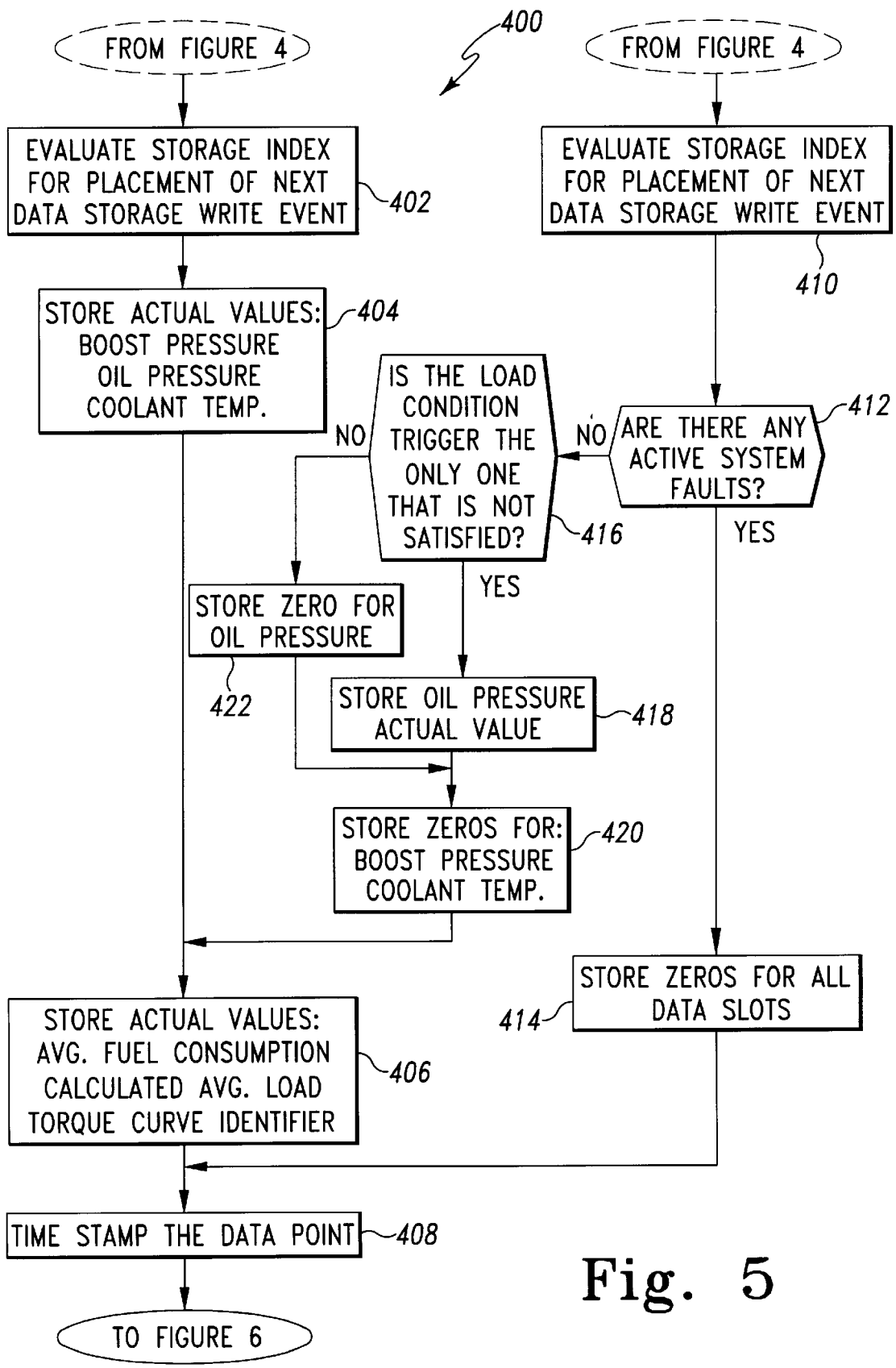
FIG. 5 is a schematic process diagram of a portion of the algorithm of FIG. 1 for storing data.

Referring now to FIG. 5 specifically, the algorithm reaches step 402 if all of the trigger preconditions are satisfied, if the trigger time delay is satisfied, and if there are no active system faults present (see FIG. 4). Step 402 then evaluates the storage index in order to determine where the upcoming data set should be placed in non-volatile memory. The area of memory available to the ECM for storing the present trending data is indicated by the value of Trending_Storage Table and is placed in a number of incremental storage locations, the total number of such locations being determined by the value of Trending_Number_Of Samples (a calibratable predetermined number). In the preferred embodiment, this storage buffer operates as a circular buffer, wherein data will be written over older data at the beginning of the buffer once the end of the buffer is reached. However, the circular buffer operates so as not to overwrite the initial three data sets taken in the first 100 hours of operation, as these comprise baseline information. The current place in the Trending_Storage_Table is indicated by a variable Trending_Number_Of_Samples_Taken that is incremented each time a data set is stored to memory.

Therefore, if Trending_Interval_Window_Active has been set to ACTIVE and Trending_Trigger_Cond_True has been set to TRUE, the algorithm responds as follows at step 404:

i) Set trending_data_set taken=TRUE ii) Write Boost_Pressure to Trending_Storage_Table iii) Write Oil_Pressure to Trending_Storage_Table iv) Write Coolant_Temperature to Trending_Storage_Table.

Then, at steps 406 and 408, the subroutine 400 does the following:

i) Trending_Average_Fuel_Consumption=((Total_Fuel_Usage—Trending Fuel_Usage_Start)/(Trending_Interval_Timer +Trending_Interval_Window_Timer))

ii) Write Trending_Average_Fuel_Consumption to Trending_Storage_Table iii) Trending_Load_Interval_Average=Trending_Load_Running Total/Trending_Averaging_Number_Of_Counts iv) Write Trending_Load_Interval_Average to Trending_Storage_Table v) Shift Engine_Run_Time one byte right (reduced resolution) and store the time value in Trending_Time_Stamp vi) Write_Trending_Time_Stamp to Trending_Storage_Table vii) Shift Throttle_100_Fueling one byte right (reduced resolution) and store the value in Trending_Torque_Curve_Identifier viii) Write Trending_Torque_Curve_Identifier to Trending_Storage_Table The subroutine then returns to block 500 of the algorithm 10 (see FIG. 1), which executes the reset algorithm.

As described hereinabove, steps 402–406 operate to store a data set to non-volatile memory when all of the trigger preconditions have been met for the predetermined trigger time delay. If, however, the window active timer has expired (step 302) without the trigger conditions all being satisfied, subroutine 400 is entered at step 410, which performs the same functions as step 402. If the ten percent (10%) interval window has expired and a data set has not been taken because an active system fault was present (as determined at step 412), then the event is marked by writing zeros to all of the current data set storage locations in the storage table as place holders (step 414) and by writing Trending_Time Stamp to the storage table in non-volatile memory at step 408. Specifically, steps 414 and 408 perform the following operations:

i) Write 0 to Boost_Pressure slot in Trending_Storage_Table ii) Write 0 to Oil_Pressure slot in Trending_Storage_Table iii) Write 0 to Coolant-Temperature slot in Trending_Storage_Table iv) Write 0 to Trending_Average_Fuel_Consumption slot in Trending Storage_Table v) Write 0 to Trending_Load_Interval_Average slot in Trending_Storage Table vi) Shift Engine_Run_Time one byte right (reduced resolution) and store the time value in Trending_Time_Stamp vii) Write Trending_Time_Stamp to Trending_Storage_Table viii) Write 0 to Trending_Torque_Curve_Identifier slot in Trending_Storage Table If, on the other hand, step 412 determines that there are no active system faults, then subroutine 400 proceeds to step 416 in order to determine if the ten percent (10%) interval window has expired and a data set has not been taken only because the loading trigger precondition has not been met. If the loading trigger precondition is the only trigger that has not been met, then steps 418 and 420 store the actual oil pressure value and store zeros for boost pressure and coolant temperature as follows:

```
IF  Trending_Interval_Window_Active = INACTIVE AND
    Trending_Interval_Window_Active_Last = ACTIVE AND
    (Trending_Percent_Load_Min > = J1587_Percent_Load OR
    J1587_Percent_Load > Trending_Percent_Load_Max) AND
    Trending_Engine_Speed_Min < Engine_Speed <
    Trending_Engine_Speed Max AND
    Trending_IMT_Min < Intake_Manifold_Temperature < =
    Trending_Clnt Tmp_Max AND
    Trending_Clnt_Temp_Min < Coolant_Temperature < =
    Trending_Clnt Tmp_Max
THEN
i)   Set trending_data_set_taken = TRUE
ii)  Write 0 to Boost_Pressure slot in Trending_Storage_Table
iii) Write 0 to Coolant_Temperature slot in Trending_Storage_Table
iv)  Write Oil_Pressure to Trending_Storage_Table
```

If, on the other hand, step 416 determines that the loading trigger precondition is not the only trigger that was not satisfied, step 422 and step 420 record zeros to non-volatile memory for oil pressure, boost pressure, and coolant temperature as follows:

i) Set trending_data_set_taken=TRUE ii) Write 0 to Boost_Pressure slot in Trending_Storage_Table iii) Write 0 to Oil_Pressure slot in Trending_Storage_Table iv) Write 0 to Coolant_Temperature slot in Trending_Storage_Table After step 420, the subroutine 400 continues to step 406.

Figure 6:
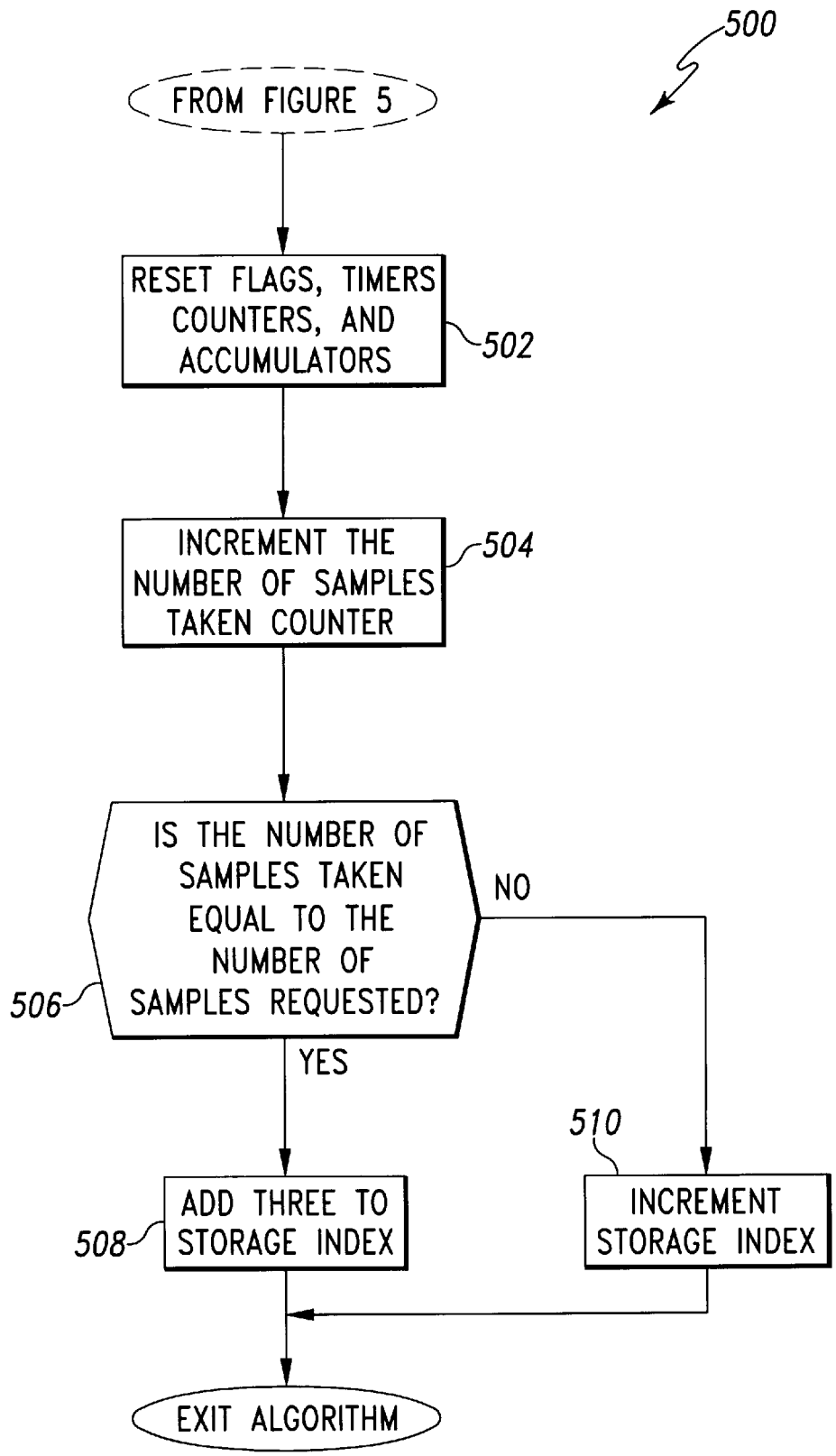
FIG. 6 is a schematic process diagram of a portion of the algorithm of FIG. 1 for resetting the engine parameter trending algorithm.

Referring once again to FIG. 1, block 500 resets and increments various flags and counters used by the algorithm so that they will reflect the correct information the next time the algorithm 10 is executed. The subroutine 500 is illustrated in greater detail in FIG. 6, in which step 502 resets a variety of flags, timers, counters, and accumulators as follows:

i) Set Trending_Averaging_Number_Of_Counts=0 ii) Set Trending_Interval_Timer=0 iii) Set Trending_Interval_Window_Timer=0 iv) Set Trending_Trigger_Cond_Timer=0 v) Set Trending_Trigger_Cond_True=FALSE vi) Set Trending_Interval_Window_Active=INACTIVE vii) Set Trending_Load_Running_Total=0

Next, in step 504, the counter Trending_Number_Of_Samples_Taken is incremented. Step 506 then determines if the number of samples which have been taken is equal to the number of samples for which space has been allocated in memory (Trending_Number_Of_Samples_Taken=Trending_Number_Of Samples?). In other words, has the circular buffer been filled such that using the current value of the storage index will result in new data overwriting the initial three data points in the circular buffer? If step 506 determines that this is the case, then step 508 adds three to the variable Trending_Storage_Index in order to prevent overwriting of the baseline data. If step 506 is false, then step 510 simply increments Trending_Storage_Index by one. After either step 508 or 510, the algorithm 10 is exited.

It will be appreciated by those having ordinary skill in the art that the preferred embodiment algorithm described above operates to save relevant trending data to non-volatile memory throughout the life of the engine in order to provide baseline and previous historical data on engine performance as an aid to troubleshooting and failure prediction. The algorithm operates to store a full set of datapoints only after a number of predetermined trigger conditions have been satisfied for a predetermined length of time. However, even if all of the predetermined trigger conditions have not been met for the predetermined length of time, the algorithm of the present invention is still operable in many instances to save relevant data, even though a full data set will not be stored under such conditions. This feature of the present invention ensures that all relevant data that is available is recorded, even though conditions do not exist which warrant saving an entire data set. Such partial data can be very useful in subsequent troubleshooting and diagnostics operations, even though the full data set is not available for those intervals.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for engine parameter trending, comprising the steps of:
   a) producing a plurality of engine parameter input signals indicative of an operating state of the engine;
   b) comparing a first subset of the plurality of engine parameter input signals to a plurality of respective predetermined trigger conditions; and
   c) storing a second subset of the plurality of engine parameter input signals if the first subset of the plurality of engine parameter input signals satisfy the plurality of respective predetermined trigger conditions for a predetermined length of time.

2. The method of claim 1, wherein:
   the first subset of the plurality of engine parameter input signals comprises an engine speed signal, a percent engine load signal, an engine intake manifold temperature signal, and an engine coolant temperature signal; and
   the second subset of the plurality of engine parameter input signals comprises a turbocharger boost pressure signal, an engine oil pressure signal, an engine coolant temperature signal, an engine load value, an average fuel consumption value and a torque curve identifier.

3. The method of claim 1, further comprising the steps of:
   d) storing zero values in place of the second subset of the plurality of engine parameter input signals if an active system fault has been sensed, wherein the zero values serve as place holders to indicate that no actual data was stored.

4. The method of claim 1, further comprising the steps of:
   d) if the predetermined trigger conditions were not satisfied at step (c) because only a predetermined one of the first subset of the plurality of engine parameter input signals failed to satisfy the predetermined trigger conditions, then storing a third subset of the plurality of engine parameter input signals, wherein the third subset is smaller than the second subset.

5. The method of claim 4, wherein:
   the first subset of the plurality of engine parameter input signals comprises an engine speed signal, a percent engine load signal, an engine intake manifold temperature signal, and an engine coolant temperature signal; and
   the second subset of the plurality of engine parameter input signals comprises a turbocharger boost pressure signal, an engine oil pressure signal, and the engine coolant temperature signal;
   the third subset of the plurality of engine parameter input signals comprises the engine oil pressure signal; and
   the predetermined one of the first subset of the plurality of engine parameter input signals comprises the percent engine load signal.

6. The method of claim 5, further comprising the step of:
   e) storing zero values in place of the turbocharger boost pressure signal and the engine coolant temperature signal, wherein the zero values serve as place holders to indicate that no actual data was stored.

7. The method of claim 1, further comprising the step of:
   d) storing zero values in place of the second subset of the plurality of engine parameter input signals if the first subset of the plurality of engine parameter input signals fails to satisfy the plurality of respective predetermined trigger conditions for the predetermined length of time.

8. A method for engine parameter trending, comprising the steps of:
   a) establishing a first predetermined interval of time;
   b) waiting for the first predetermined interval of time to expire;
   c) establishing a data window commencing upon the expiration of the first predetermined interval and lasting for a length equal to a predetermined percentage of the first predetermined interval;
   d) producing a plurality of engine parameter input signals indicative of an operating state of the engine;
   e) comparing a first subset of the plurality of engine parameter input signals to a plurality of respective predetermined trigger conditions; and
   f) storing a second subset of the plurality of engine parameter input signals if the first subset of the plurality of engine parameter input signals satisfy the plurality of respective predetermined trigger conditions for a predetermined length of time prior to an expiration of the data window.

9. The method of claim 8, wherein the first subset of the plurality of engine parameter input signals comprises an engine speed signal, a percent engine load signal, an engine intake manifold temperature signal, and an engine coolant temperature signal; and
   the second subset of the plurality of engine parameter input signals comprises a turbocharger boost pressure signal, an engine oil pressure signal, and the engine coolant temperature signal.

10. The method of claim 8, further comprising the steps of:
    storing zero values in place of the second subset of the plurality of engine parameter input signals if an active system fault has been sensed, wherein the zero values serve as place holders to indicate that no actual data was stored.

11. The method of claim 8, further comprising the steps of:
    g) if the predetermined trigger conditions were not satisfied at step (f) prior to expiration of the data window because only a predetermined one of the first subset of the plurality of engine parameter input signals failed to satisfy the predetermined trigger conditions, then storing a third subset of the plurality of engine parameter input signals, wherein the third subset is smaller than the second subset.

12. The method of claim 11, wherein:

the first subset of the plurality of engine parameter input signals comprises an engine speed signal, a percent engine load signal, an engine intake manifold temperature signal, and an engine coolant temperature signal; and the second subset of the plurality of engine parameter input signals comprises a turbocharger boost pressure signal, an engine oil pressure signal, and the engine coolant temperature signal;

the third subset of the plurality of engine parameter input signals comprises the engine oil pressure signal; and the predetermined one of the first subset of the plurality of engine parameter input signals comprises the percent engine load signal.

13. The method of claim 12, further comprising the step of:

h) storing zero values in place of the turbocharger boost pressure signal and the engine coolant temperature signal, wherein the zero values serve as place holders to indicate that no actual data was stored.

14. The method of claim 8, further comprising the step of:

g) storing zero values in place of the second subset of the plurality of engine parameter input signals if the first subset of the plurality of engine parameter input signals fails to satisfy the plurality of respective predetermined trigger conditions for the predetermined length of time prior to expiration of the data window.

15. The method of claim 8, wherein:

the first predetermined interval of time is a first value until a predetermined number of data sets are stored at step (f), and a second value thereafter;

step (f) comprises storing data into a circular buffer such that, once the circular buffer is fill, new data overwrites the oldest data in the circular buffer, except that the predetermined number of data sets are not overwritten.

* * * * *

UNITED STATES PATENT AND TRADEMARK OFFICE
CERTIFICATE OF CORRECTION

PATENT NO : 5,968,107
DATED : October 19, 1999
INVENTOR(S) : Mitchell P. Vogan et al.

It is certified that error appears in the above-identified patent and that said Letters Patent is hereby corrected as shown below:

In column 4, line 3, please delete "time" and insert in lieu thereof --Time--.

In column 5, line 24, please insert --_-- after "Engine" and before "State".

In column 6, line 8, please insert --_-- after "Trending" and before "Interval".

In column 8, line 8, please delete "an" and insert in lieu thereof --all--.

In column 10, line 1, please delete "coolent" and insert in lieu thereof --coolant--.

In column 14, line 16, please delete "fill" and insert in lieu thereof --full--.

Signed and Sealed this

Fifth Day of December, 2000

Attest:

Q. TODD DICKINSON

Attesting Officer

Director of Patents and Trademarks